United States Patent
Sato et al.

(10) Patent No.: US 6,186,615 B1
(45) Date of Patent: Feb. 13, 2001

(54) APPARATUS AND METHOD FOR FORMING A BLACK IMAGE IN WHICH BLACK INK IS OVERLAID ON COLOR INK

(75) Inventors: Shinichi Sato, Kawasaki; Makoto Aoki, Yokohama; Jiro Moriyama, Yokohama; Hiroshi Sato, Yokohama; Mayumi Yamamoto, Tokyo; Hisao Yaegashi; Yoshihisa Takizawa, both of Kawasaki; Hideto Yokoi, Yokohama, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 08/789,735

(22) Filed: Jan. 27, 1997

Related U.S. Application Data

(63) Continuation of application No. 08/138,011, filed on Oct. 19, 1993, now abandoned.

(30) Foreign Application Priority Data

Oct. 30, 1992 (JP) ................................................... 4-292346
Oct. 30, 1992 (JP) ................................................... 4-292347
Oct. 30, 1992 (JP) ................................................... 4-293018

(51) Int. Cl.[7] ............................. B41J 2/21; G01D 11/00
(52) U.S. Cl. ........................................... 347/43; 347/100
(58) Field of Search ........................ 347/15, 43, 100.41, 347/14; 395/109

(56) References Cited

U.S. PATENT DOCUMENTS

| 4,675,696 | 6/1987 | Suzuki | 346/46 |
|---|---|---|---|
| 4,682,216 | 7/1987 | Sasaki et al. | 358/79 |
| 4,760,408 | 7/1988 | Kanayama | 346/149 R |
| 4,952,942 | * 8/1990 | Kanome et al. | 347/15 |
| 4,965,612 | 10/1990 | Sakaki et al. | 346/1.1 |
| 5,057,852 | * 10/1991 | Formica et al. | 347/43 |
| 5,078,790 | 1/1992 | Tochihara et al. | 106/20 |
| 5,080,716 | 1/1992 | Aoki et al. | 106/20 |
| 5,082,496 | 1/1992 | Yamamoto et al. | 106/22 |
| 5,127,946 | 7/1992 | Eida et al. | 106/22 |
| 5,130,723 | 7/1992 | Yamamoto et al. | 346/1.1 |
| 5,131,949 | 7/1992 | Tochihara et al. | 106/20 |
| 5,132,700 | 7/1992 | Tochihara et al. | 346/1.1 |
| 5,178,671 | 1/1993 | Yamamoto et al. | 106/22 K |
| 5,213,614 | 5/1993 | Eida et al. | 106/22 K |
| 5,215,577 | 6/1993 | Eida et al. | 106/22 K |
| 5,215,578 | 6/1993 | Eida et al. | 106/22 K |
| 5,220,342 | * 6/1993 | Moriyama | 347/43 |
| 5,371,531 | * 12/1994 | Rezanka et al. | 347/43 |
| 5,380,358 | * 1/1995 | Aoki et al. | 347/100 X |
| 5,428,377 | * 6/1995 | Stoffel et al. | 347/15 |
| 5,477,248 | * 12/1995 | Sugimoto et al. | 347/43 |
| 5,488,398 | * 1/1996 | Matsubara et al. | 347/43 |
| 5,512,923 | * 4/1996 | Bauman | 347/15 |

FOREIGN PATENT DOCUMENTS

| 3408322 | 9/1984 | (DE) . |
|---|---|---|
| 0187352 | 7/1986 | (EP) . |
| 0390473 | 10/1990 | (EP) . |
| 55-29546 | 3/1980 | (JP) . |
| 4158049 | 6/1992 | (JP) . |

* cited by examiner

Primary Examiner—Thinh Nguyen
(74) Attorney, Agent, or Firm—Fitzpatrick, Cella, Harper & Scinto

(57) ABSTRACT

A method of forming a black image on a recording member includes the steps of providing each of a black ink having a first penetration rate and at least one color ink having a second penetration rate different from the first penetration rate, applying the at least one color ink to the recording member, and applying the black ink to the recording member after the at least one color ink has been absorbed into the recording member is disclosed. An ink-jet recording apparatus is also disclosed.

51 Claims, 11 Drawing Sheets

⊘ LACED PATTERN DOT

○ INVERSELY LACED PATTERN DOT

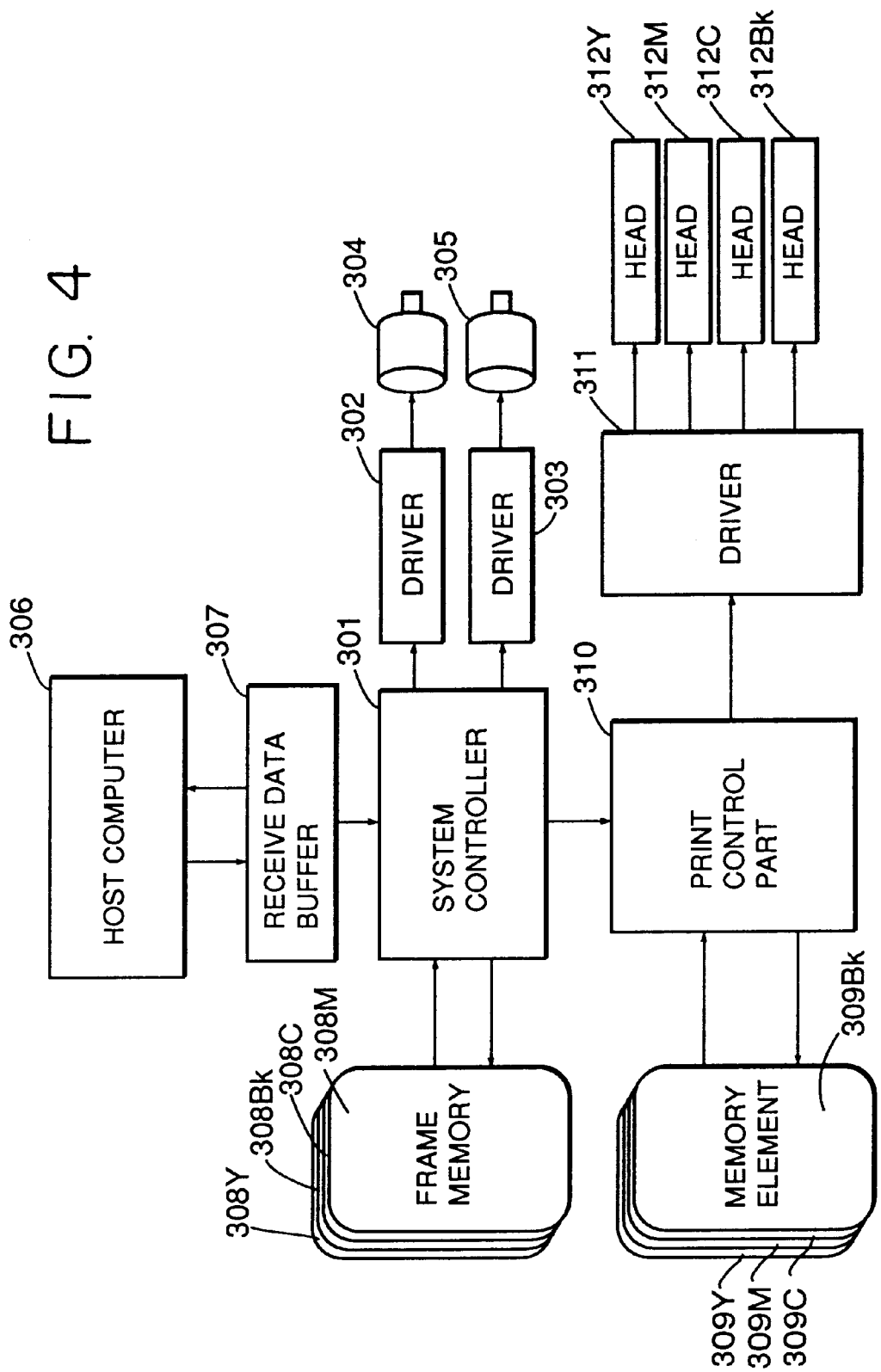

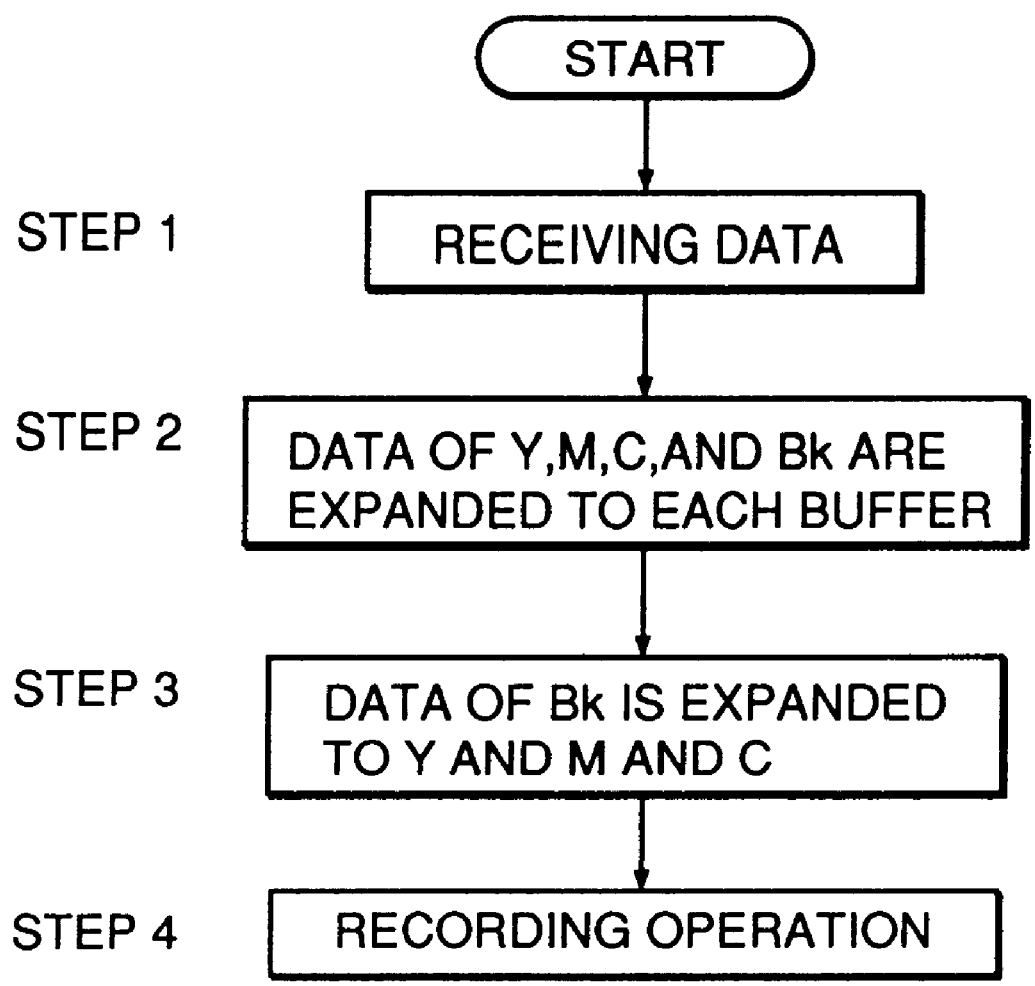

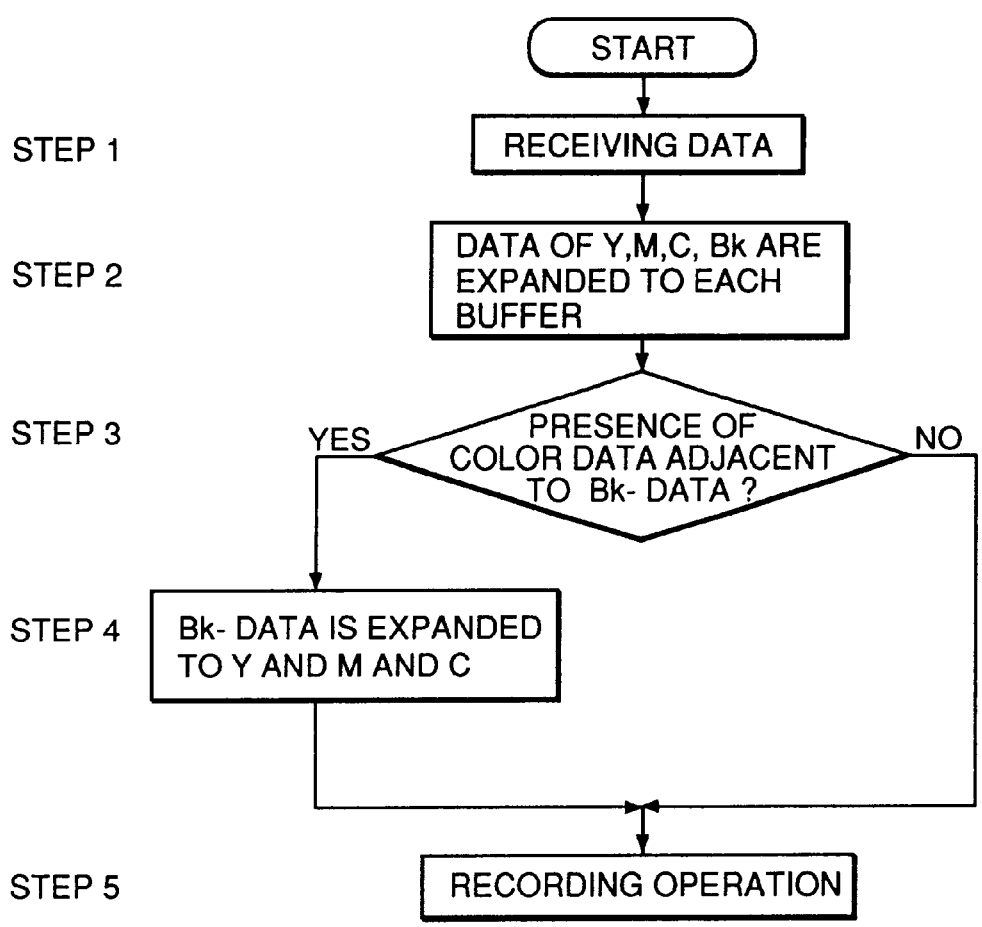

A     XX YY ZZ — BLACK

B

○ : COLOR INK
● : Bk INK
▲ : Bk AND YMC INK

○ : COLOR INK
● : Bk INK
▲ : Bk AND YMC INK

○ : COLOR INK
▲ : Bk AND YMC INK

○ : COLOR INK
● : Bk AND Y INK
▲ : Bk AND M INK
■ : Bk AND C INK

○ : COLOR INK
● : Bk INK
▲ : Bk AND YMC INK

RECORDING PATTERN OF BLACK INK

RECORDING PATTERN OF YELLOW INK

RECORDING PATTERN OF MAGENTA INK

RECORDING PATTERN OF CYAN INK

APPARATUS AND METHOD FOR FORMING A BLACK IMAGE IN WHICH BLACK INK IS OVERLAID ON COLOR INK

This application is a continuation of application No. 08/138,011 filed Oct. 19, 1993, now abandoned.

BACKGROUND OF THE INVENTION

1. Field of the Invention

The present invention relates to a recording technology employing an ink-jet recording method as a means for obtaining pictures, color graphics, or color hard-copies produced from computer graphics, color CRT displays, or the like and; more specifically, to an ink-jet recording technology which can reproduce color images that are faithful to the original, while maintaining clearness and high density.

2. Description of the Related Art

An ink-jet recording method has been used for terminal printers of word-processing machines and computers, copying machines, facsimile machines, or the like, due to its low noise, low operational cost, feasibility of downsizing, ease of color recording, and the like.

Generally, a color ink-jet recording method employs three primary colors, i.e., cyan, magenta, and yellow, and may further add black as a fourth color.

In the conventional ink-jet recording method, it was necessary to use a specific type of paper having an ink absorption layer to obtain a highly developed color-image with no blurring of ink. However, due to the recent improvement of ink, plain paper being suitable for ink-jet printing, which is used for printers and copying machines in large quantity, has been put into practical use. However, it is widely recognized that the printing quality of plain paper is still inadequate. The biggest reason for this deficiency is an incompatibility between the incidence of blurring and recording quality of a black image (particularly, recording quality of black letters), in which the blurring occurs between different color inks, which is referred to as bleeding.

As disclosed in Japanese Laid-Open Publication No. #55-29546, quick-drying ink having a high penetration rate on plain paper is generally used to produce a color image on plain paper by means of the ink-jet recording method. A high-quality image without bleeding incidence can be obtained by using the above-mentioned ink. However, such ink has a low image-density and further tends to allow so-called feathering in which the ink blurs slightly along fibers in paper in the periphery of each color image. Even though such feathering may be barely noticeable in a color image area, it is conspicuous in a black image area thereby causing deterioration in printing quality. The printing quality becomes poor especially when the black image is formed by black letters which become illegible due in part to a lack of sharpness.

To overcome the above-described ink inferiority, and to obtain an image having decreased feathering and also having much higher density and high quality, it is necessary to use black ink having a relatively slow penetration rate on plain paper. In this case, however, each ink may blur at the adjacent boundary portion of the recording image areas where black and color inks meet.

There is a "trade off" relationship between the prevention of blurring between black ink and color inks and the improvement of quality of the color image obtained by the reduced incidence of feathering in the black image.

According to Japanese Laid-Open Publication No. #4-158049, a combined use of print heads of a plurality of colors for color recording and a print head for letter recording has been proposed, in which the use of these two different heads are switched according to the recording image. However, disadvantages such as high cost and the inevitability of large-sized apparatus are unavoidable in this method because the head for letter recording is used in combination with the conventional heads of a plurality of colors for color recording.

SUMMARY OF THE INVENTION

In order to overcome the above-described problems, the present invention is aimed at providing an ink-jet recording technology which materializes the capability of high-quality black recording and high-quality color recording, wherein a superior printing quality of a black image having high density and reduced feathering can be obtained when an independent black image area which does not contact a color image area, is recorded; and also a superior printing quality of a color image having no blurring between black ink and color inks can be obtained when the black image is recorded adjacent to the color image.

To attain the above object, the present invention in one aspect provides a method of forming a black image. The method comprises applying black ink and a plurality of color inks, in which each color ink having a different penetration rate on the recording member from the black ink, wherein the black ink is applied to the recording member after at least one color ink of the plurality of color inks is absorbed thereto.

According to another aspect of the present invention, an ink-jet recording method of forming a black image on a recording member comprises the steps of applying black ink and a plurality of color inks, each color ink having a different penetration rate on the recording member from the black ink; and a decision process which determines a presence of image data which forms a color image adjacent to the black image, wherein the process decides according to the determination whether only black ink is applied to form the black image, or whether black ink is applied to the recording member after at least one color ink of the plurality of color inks is absorbed thereto.

According to still another aspect of the present invention, an ink-jet recording apparatus comprises: means for determining a presence of image data which forms a color image adjacent to the black image, the means having a set of inks comprising of black ink and a plurality of color inks. Each color ink having a different penetration rate on a recording member from the black ink. Also provided is means for deciding according to the determination whether only black ink is applied to form the black image, or whether black ink is applied to the recording member after at least one color ink of the plurality of color inks is absorbed thereto; and means for performing printing.

According to a further aspect of the present invention, an ink-jet recording method using an ink-jet recording apparatus to conduct an image recording comprises the steps of applying black ink and an ink having a larger content amount of nonionic surfactant than the black ink to eliminate any disturbance in the image appearance and to ensure a stable paper transfer system to prevent deterioration in the quality of the recording image, when a black image having a density of more than a specific threshold value is formed at an area of the recording paper with a printed image thereon where a paper transfer system of the recording apparatus contacts.

According to yet a further aspect of the present invention, an ink-jet recording method comprises the steps of employing a plurality of inks including black ink, wherein black ink has a least content amount of nonionic surfactant of the ethylene-oxide type, e.g., ethylene oxide addition products of higher alcohol, alkylphenol, polyalcohol, and acetylene glycol; and a printing can be performed by using black-color liquid obtained by mixing black ink and a plurality of the color inks on an area where an amount of black ink for printing per unit area of a recording paper exceeds a threshold value.

According to another aspect of the present invention, a method of forming a black image on a recording member includes the steps of providing each of a black ink having a first penetration rate and at least one color ink having a second penetration rate different from the first penetration rate, applying the at least one color ink to the recording member, and applying the black ink to the recording member after the at least one color ink has been absorbed into the recording member.

According to a further aspect of the present invention, an ink-jet recording method of forming a black image on a recording member based on image data includes the steps of providing each of a black ink having a first penetration rate, and a plurality of color inks at least one of which has a second penetration rate different from the first penetration rate, determining one of a presence or an absence of an adjacent region between a color image and a black image in the image data, and applying ink to the recording member to form the black image in accordance with the determination in said determining step that either black ink alone is applied to the recording member or black ink is applied to the recording member after the at least one of the plurality of color inks has been absorbed into the recording member.

According to a further aspect of the present invention, an ink-jet recording method for forming a black image on a recording member based on image data includes an ink set having a black ink with a first penetration rate and a plurality of color inks at least one of which has a second penetration rate different from the first penetration rate, a determining means for determining one of a presence or an absence of an adjacent region between a color image and a black image in the image data, deciding means for deciding in accordance with a determination by the determining means whether the black image should be formed either by applying only black ink to the recording member or by applying black ink to the recording member after the at least one of the plurality of color inks has been absorbed into the recording member, and printing means for applying ink to the recording member to form the black image in accordance with a decision of the deciding means.

According to another aspect of the present invention, an ink-jet recording method of recording an image using an ink-jet recording apparatus configured such that at least one portion of a recording paper with a printed image thereon contacts a portion of the ink-jet recording apparatus, includes the steps of providing a first ink and a second ink, the first ink being black ink and the second ink containing a larger amount of non-ionic surfactant than the first ink, and applying the first and second inks to the recording paper such that the black image is formed on at least one portion of the recording paper that contacts the ink-jet recording apparatus, the formed black image having a density greater than a predetermined threshold value.

According to still another aspect of the present invention, an ink-jet recording method includes the steps of providing a plurality of inks including a plurality of color inks and a black ink containing a lesser amount of non-ionic surfactant of an ethylene-oxide type than at least one of the plurality of color inks, and printing an image by mixing the black ink and the at least of the plurality of color inks on an area in which an amount of black ink for printing per unit area of a recording paper exceeds a threshold value.

BRIEF DESCRIPTION OF THE DRAWINGS

FIG. 4 is a block diagram of a controlling circuit of the ink-jet recording apparatus according to an embodiment of the present invention.

FIG. 5 is a flow chart illustrating an operation of example 1.

FIG. 6 is a flow chart illustrating an operation of example 2.

FIGS. 12A, 12B, 12C, and 12D are illustrations of examples of recording patterns according to an embodiment of the present invention, in which:

These FIGS. 12A, 12B, 12C, and 12D show the recording patterns of black ink, yellow ink, magenta ink, and cyan ink respectively.

DESCRIPTION OF THE PREFERRED EMBODIMENTS

Figure 1A:
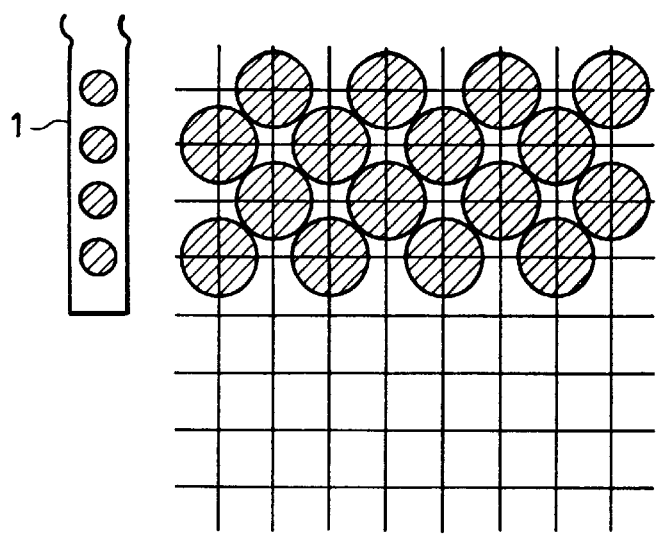
FIGS. 1A, 1B, and 1C are schematic illustrations showing printing patterns conducted by a split-recording method.

According to the present invention, color ink having a characteristic of a high penetration rate (quick fastness) is applied to a recording paper to form a primary coat of black ink having a relatively low penetration rate (slow fastness). Therefore, the wettability of the surface of the recording paper is brought to a satisfactory level. Accordingly, a high-quality color image, which prevents the incidence of bleeding between black ink and color inks, can be obtained by quickening the fastness of black ink, which can be accomplished by forming an interface having a favorable penetration property. Especially when a color image is not formed in the surrounding boundary or periphery of a black image forming area, a black image having a high recording density with a reduced incidence of feathering can be formed; and when the color image is formed in an adjacent area of, or by overlapping with, the black image forming area, a superior color image is formed in which the fastness of black ink can be accelerated and bleeding is prevented from occurring between the black and color images.

According to the present invention, a high-quality black image and a high-quality color-image can be compatibly achieved.

In the present invention, the penetration rate can be evaluated by dropping 1 μl of ink on a recording member (e.g., plain paper) which is then rubbed with a finger. When the period of time is short until no smearing occurs on the finger or on the recording member, by the rubbing, the penetration rate is defined as "high."

When an SK paper made by CANON Inc. is employed as plain paper, it is ideal to use color ink having a penetration rate of less than 60 seconds, preferably less than 20 seconds, and black ink having a penetration rate of more than 120 seconds.

When the black image area adjoins the color image area, the terminology "adjacent" is used in the present invention. This terminology "adjacent" can be used when at least one color recording-pixel which forms the color image, in contrast with at least one black recording-pixel which forms the black image area on the recording member, can exist within the recording area represented by X×P, wherein P is a minimum pixel pitch of recording and X is a value which satisfies an expression $4\sqrt{2} \geq X \geq 1$. In terms of the location of adjacent color ink, when X is 1, at least one color recording pixel which forms the color image area exists either on the top, bottom, or sides of the black recording pixel. When X is $\sqrt{2}$, at least one color recording pixel which forms the color image area exists either on the top, bottom, sides, and/or either on the top-right, bottom-right, top-left, bottom-left of the black recording pixel. When X is 2 or $2\sqrt{2}$, the same method as above can be used.

Furthermore, in the present invention, a determination of whether a color image area exists or not in an area adjacent to the black image area can be conducted only when the black image area is within an effectively controllable range of a line memory of a recording unit. Otherwise, the above-described determination cannot be conducted, but color ink is applied in advance on all the areas where black ink is to be applied to form the black image.

According to the present invention, it is preferable that the ink jetting quantity (volume) per 1 pixel of color ink be less than that of the black ink, more desirably, within a range between ⅓ and ⅔ of the black ink's jetting quantity. For instance, when the color-ink jetting quantity is approximately 40 pl, the preferable quantity of black ink is approximately 80 pl.

When at least one portion of the periphery of the black image area is adjacent to a color image, a black-color unit image can be formed by conducting a plurality of operations of a recording head. This printing method is called a split-recording method, and a description thereof will now be given in conjunction with FIGS. 1A, 1B, and 1C.

Figure 1B:
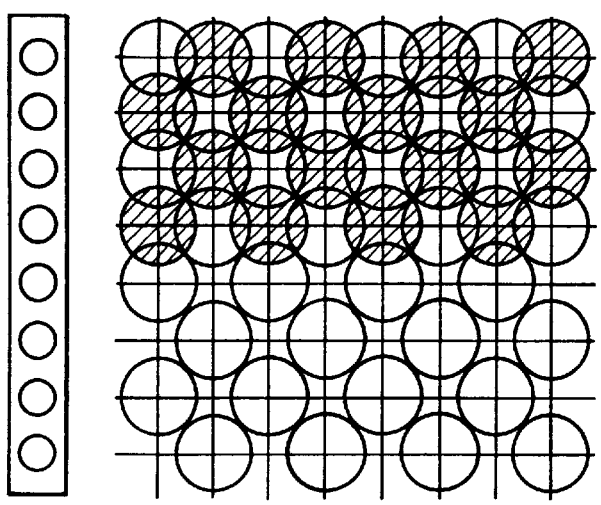
Figure 1C:
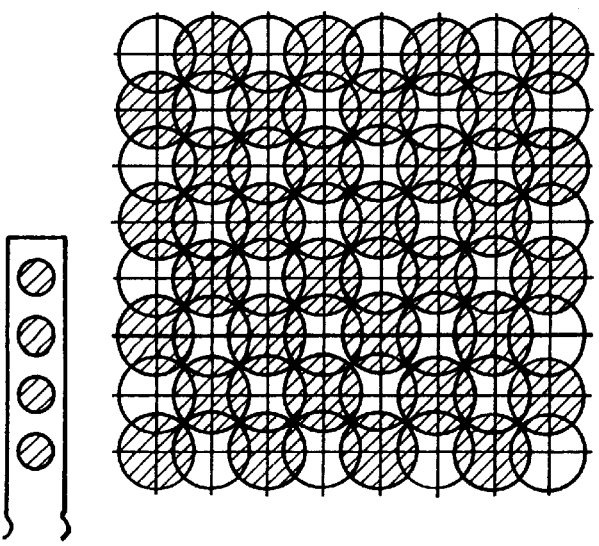

In the split-recording method, a multi-head 1 has performed its scanning 3 times to completely form the printing area shown in FIG. 1C. However, 4-pixel units or half of the printing area shown in FIG. 1A can be completed by scanning twice. The multi-head employed in this method has 8 nozzles which are divided into 2 groups, an upper 4-nozzle group and a lower 4-nozzle group. Dots printed by one nozzle at one time form a staggered or laced lattice structure. In the first scanning operation by the multi-head, the lower 4 nozzles are used to conduct a printing of dots • forming the laced pattern as shown in FIG. 1A. In the second scanning operation, paper is fed by an extent of 4 pixels (half of the head length) to conduct a printing of dots o forming an inversely laced pattern as shown in FIG. 1B. In the third scanning, paper is fed again by 4 pixels to conduct a printing of dots • forming a laced pattern again as shown in FIG. 1C. Consequently, a recording area of a 4-pixel unit can be completed in every single scanning operation by means of feeding a paper in every 4-pixel unit and alternately recording the laced and inversely laced patterns sequentially.

The above-mentioned splitting method is already known to those skilled in the art as a method of reducing pattern fluctuation caused by nozzles. However, by means of the recording method according to the present invention, the number of adjacent dots can be reduced, thus resulting in advantage of reducing bleeding.

In the present invention, when at least one portion in the periphery of the black image area contacts a color image area, a preferable ratio of the number of adhesive pixels of color ink, which is applied prior to applying black ink, to the total number of pixels of the black image contacting the color image area is within the range of 10%–100%. As will be described later, color ink is not necessarily applied, or absorbed on the recording member, as a primary coat for all the black ink, but can be partially removed to an extent in which bleeding does not occur. Furthermore, all of the different colors of ink are not necessarily applied to the recording member, but at least one color ink can be applied thereto as a primary coat for black ink if bleeding does not occur. In the present invention, the purpose of applying color ink in advance of black ink is to provide better wettability to the recording member. Therefore, from the viewpoint of controlling color-ink consumption and excessive adhesion of the color ink to paper, it is further preferable to use color ink of a predetermined minimum amount which does not cause bleeding.

Color ink according to the present invention comprises at least one component selected from nonionic-, ionic-, amphoteric-surfactants, and monovalent aliphatic alcohol having 1–7 carbon atoms. Preferable surfactants are ethylene oxide addition-product of alkyl phenyl ether, polyethylene oxide and polypropylene oxide copolymer, nonionic-surfactant such as ethylene oxide addition-product of acetylene glycol, sulfate or sulfonate anionic surfactant, quaternary amine cationic surfactant, and betaine or amino-acid amphoteric surfactant. A preferable adding amount of the surfactant is 1%–20% by weight.

As a means for ink-jetting, either an electro-thermal converter or an electro-mechanical converter can be employed.

A plurality of color inks used in the present invention can be chosen from among yellow, magenta, cyan, red, green, and blue.

EXAMPLES

A detailed description of examples of the present invention will now be given in conjunction with the accompanying drawings. While the present invention has been described with respect to what is presently considered to be the preferred examples, it is to be understood that the invention is not limited to the disclosed examples.

Example 1

Figure 2:
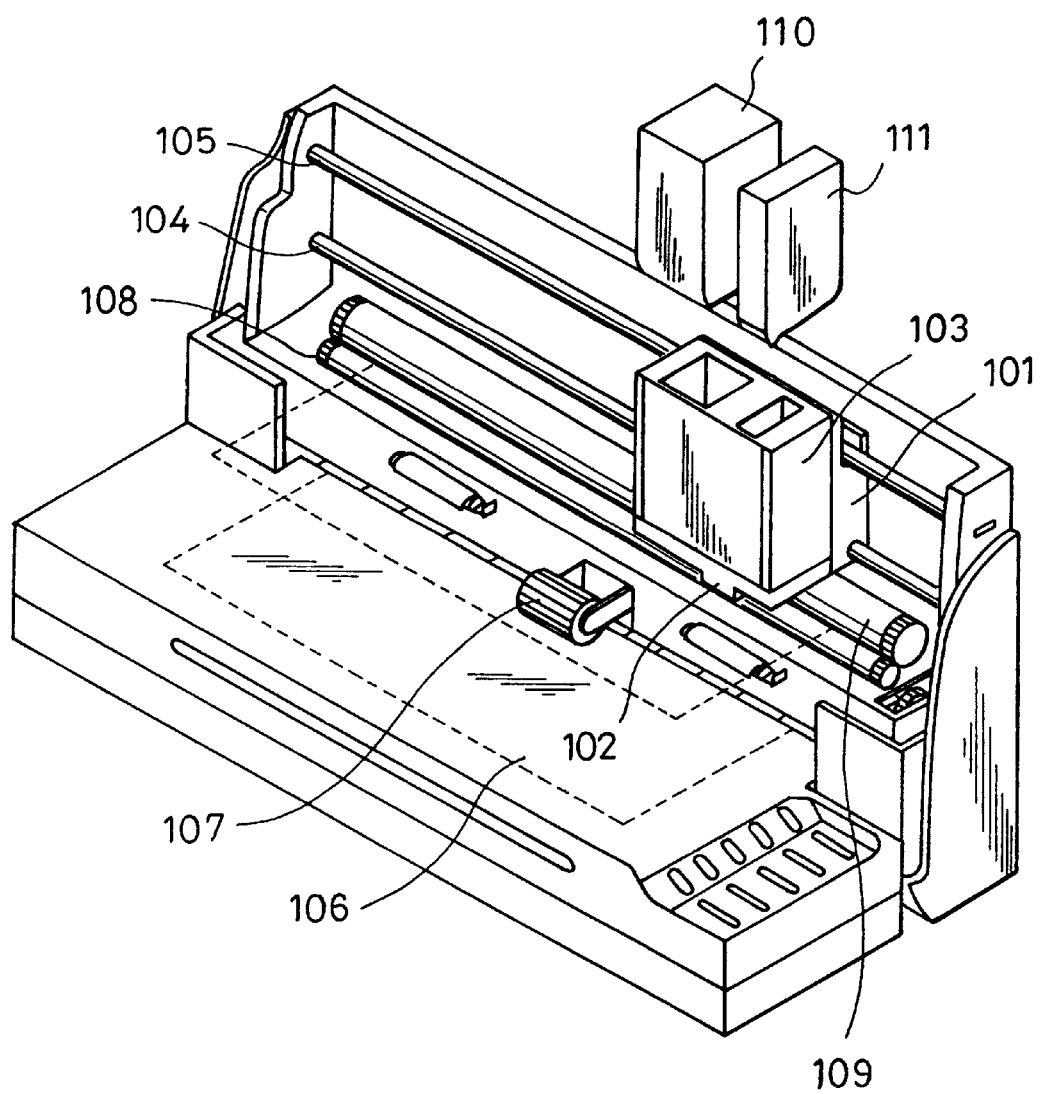
FIG. 2 is a perspective view of an ink-jet recording apparatus according to an embodiment of the present invention.

FIG. 2 is a perspective view of a recording apparatus in which an ink-jet recording method is employed according to the present invention.

A carriage 101 carries a print head 102 and a cartridge guide and travels along guide shafts 104 and 105. A recording paper 106 is fed to the inside of the recording apparatus by means of a paper-transfer roller 107, and then the paper 106 is caught by a paper feed roller 108, a pinch roller (not shown), and a platen 109. The paper 106 is then transferred to the front side of the paper feed roller 108, where printing is to be conducted. There are two ink cartridges, one is a color-ink cartridge 110 containing ink of at least one of three different colors of yellow, magenta, and cyan, and the other is a black ink cartridge 111. These cartridges are to be separately inserted in the cartridge guide 103 to communicate with the print head 102.

Yellow, magenta, and cyan inks in the color-ink cartridge 110 have a high penetration rate on the recording paper so as to prevent these inks from blurring in the boundary area of each color when they form a color image. On the other hand, black ink in the black ink cartridge 111 has a lower penetration rate on the recording paper than the three aforementioned color inks so as to make the black image have a higher density with higher quality and less ink blurring.

Figure 3A:
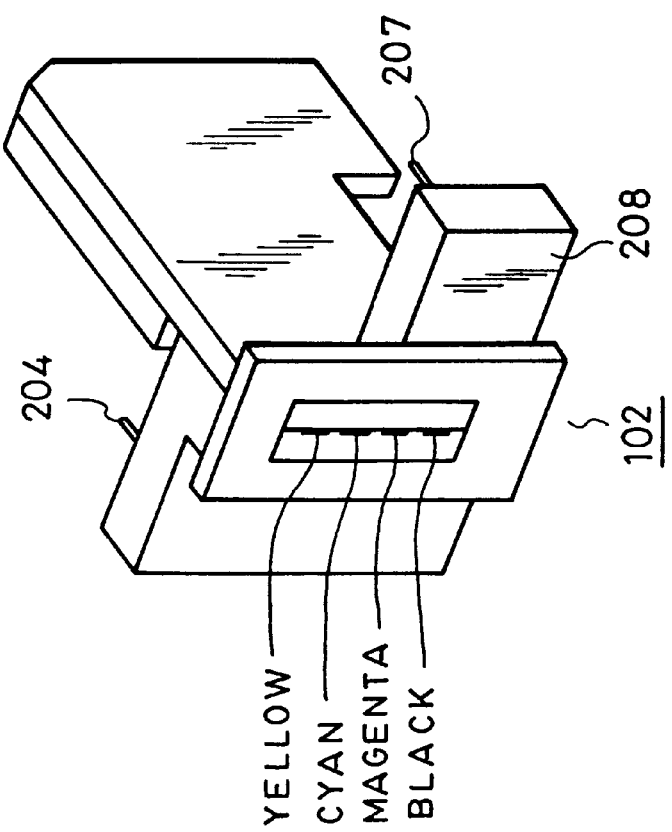
FIGS. 3A and 3B are perspective views of a head of the ink-jet recording apparatus according to an embodiment of the present invention.
Figure 3B:
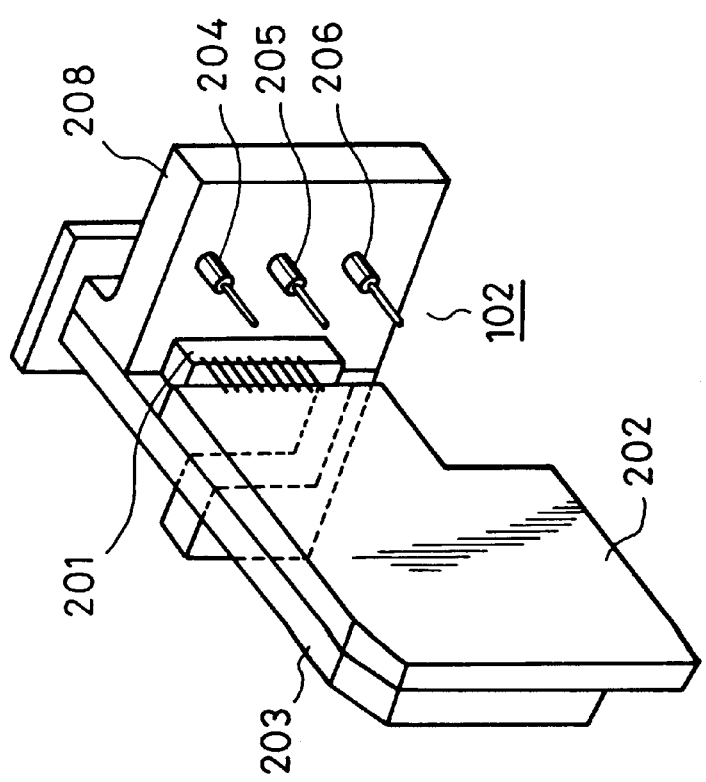

FIGS. 3A and 3B illustrate the print head 102. FIG. 3A shows the front side of the print head 102, and FIG. 3B shows the rear side of the head 102. At the front of the print head 102, groups of ink jet nozzle-ports are linearly aligned. Each nozzle has only one color of either yellow, magenta, cyan, or black. Each of the yellow, magenta, and cyan groups has 24 nozzle-ports, and the black group has 64 nozzle-ports. The gap between the each group is greater than the pitch between each of the nozzle-ports in each color group.

Each nozzle port is provided with an ink liquid passage with which it communicates. A common liquid chamber is provided for supplying ink to each group of the respective liquid passages at the rear portion thereof. In the area where ink liquid passages communicate with the corresponding nozzle-ports, there are provided an electro-thermal converter which is employed to discharge a drop of ink from each nozzle port. In addition, electrode-wiring to supply power to the converter is also provided therein. The electro-thermal converter and electrode-wiring are formed on a base plate 201 made of silicone and the like. Nozzle ports, ink liquid passages, and the respective common ink chambers are constructed by stacking a bulkhead, which is made of resin and glass material, and a roof panel on the base plate. In the rear portion of the common chambers, a driving circuit of a printed wiring board type is provided to drive the electro-thermal converter according to recording signals.

Pipes 204 through 207 project from a plastic member 208 which is referred to a distributor which vertically extends from an aluminum plate 203. These pipes 204 through 207 communicate with the respective channels provided in the inside of the distributor, and each of these channels communicates with the respective common liquid chambers. In the distributor, there are 4 channels for yellow, magenta, cyan, and black inks to provide connection between the respective pipes and the common liquid chambers.

A drop of approximately 40 pl of each color ink is discharged or jetted from the nozzle ports of yellow, magenta, and cyan inks, and approximately 80 pl of black ink is jetted from the black-ink nozzle ports. The composition of each ink is as follows:

| Yellow ink (Y) | |
|---|---|
| C.I. Direct Yellow 86 | 3 parts |
| Diethylene glycol | 15 parts |
| Isopropyl alcohol | 2 parts |
| Urea | 5 parts |

-continued

| Yellow ink (Y) | |
|---|---|
| Acetylenol EH made by KAWAKEN FINE CHEMICAL | 1 part |
| Water | Balance |

| Magenta ink (M) | |
|---|---|
| C.I. Acid Red 289 | 3 parts |
| Diethylene glycol | 15 parts |
| Isopropyl alcohol | 2 parts |
| Urea | 5 parts |
| Acetylenol EH made by KAWAKEN FINE CHEMICAL | 1 part |
| Water | Balance |

| Cyan ink (C) | |
|---|---|
| C.I. Direct Blue 199 | 3 parts |
| Diethylene glycol | 15 parts |
| Isopropyl alcohol | 2 parts |
| Urea | 5 parts |
| Acetylenol EH made by KAWAKEN FINE CHEMICAL | 1 part |
| Water | Balance |

| Black ink (Bk) | |
|---|---|
| C.I. Food Black 2 | 3 parts |
| Diethylene glycol | 15 parts |
| Isopropyl alcohol | 2 parts |
| Urea | 5 parts |
| Water | Balance |

As shown in the above tables, the respective Y-, M-, and C-inks have a high penetration rate compared with Bk-ink because 1% of Acetylenol EH of a nonionic surfactant is added to those color inks.

When the penetration rate is evaluated in accordance with the aforementioned definition by using plain paper (SK paper made by CANON Inc), the resultant rate of Bk-ink is 180 seconds or more; C-ink, 5 seconds; M-ink, 5 seconds; and Y-ink, 5 seconds.

FIG. 4 is an electric control block diagram of the aforementioned color-ink-jet recording apparatus. Reference numeral 301 is a system controller to control the overall apparatus. Provided therein are a microprocessor, a memory element (ROM) in which a control program is stored, and a memory element (RAM) which is used when the microprocessor executes its processing. Numerals 302 and 303 are drivers which drive the print head in the main traveling direction and in the sub-traveling direction respectively. Numerals 304 and 305 are motors for the above-mentioned drivers from which these motors receive operational information such as the desired speed, travel distance, and the like.

Numeral 306 is a host computer which transmits printing information to a printing apparatus. Numeral 307 is a receive data buffer which temporarily stores the data from the host computer 306. The receive data buffer accumulates data until data is read out by the system controller 301. Numeral

308 is a frame memory to expand printing data into image data. The frame memory has an adequate memory capacity for printing. While the present invention has been described with respect to a frame memory with a memory capacity equivalent to one page of printing paper, it is to be understood that the invention is not limited according to the particular size of the frame memory disclosed.

Numeral 309 is a memory element which temporarily stores printing data, in which the storage capacity varies in accordance with the number of nozzles of the print head. Numeral 310 is a printing control part to control the print head properly in accordance with a command from the system controller. The printing control part 310 controls the ink-jetting speed, printing data, and the like. Numeral 311 is a driver which drives the heads of 321Y, 312M, 312C, and 312Bk. The driver 311 is controlled in accordance with signals from the printing control part 310.

FIG. 5 is a flow chart representing the operation of example 1.

In step 1, data is transferred from the host computer 306 and received by the receive data buffer 307, and then the system controller 301 reads the data stored in the buffer 307. In step 2, data of Y, M, C, and Bk are expanded to the respective buffers. In step 3, a black recording image is expanded to Y-, M-, C-, and Bk(black)-data buffers for color recording. In step 4, a recording operation can be conducted by the recording head 102, in which the black recording image can be printed according to Bk-data and Y-, M-, and C-data, thus producing a high-quality image with no bleeding.

Example 2

In FIG. 6, an additional step 3 is provided in comparison with the example 1 of FIG. 5. In this step 3, which concerns black-color data, a determination is made whether there is any color recording data in pixels located adjacent to the periphery of the black image recording area. In this case, a pixel pitch P is approximately 79.56 $\mu$m and the recording density is 360 dpi. When there is a color pixel in an area adjacent to black recording pixels, the operation proceeds to step 4. On the other hand, when there is no adjacent color pixels, the operation proceeds to step 5. Steps 4 and 5 of example 2 are the same as steps 3 and 4, respectively, in example 1.

Figure 7:
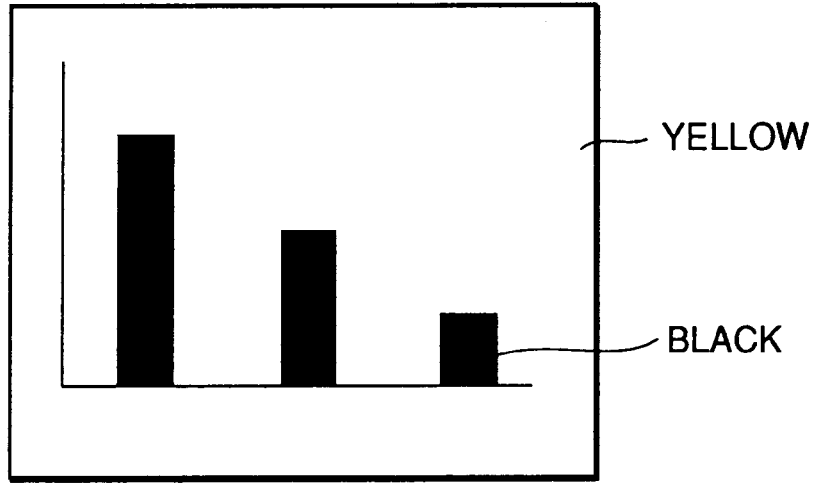
FIG. 7 is a schematic illustration of image samples to explain the present invention.

FIG. 7 is an example in which the black and color images are mixed. An image part A is constructed with black letters, X, Y, and Z which are underlined. An image part B consists of a black-color graph with a yellow-color background.

According to example 2, the image part A is formed of only the black color with no background color. There is no color recording area which contacts the black recording area; therefore, the black image is formed only of black ink. On the other hand, in the image part B, the entire area surrounding the black image is formed by a color image. At least one color ink of the three, i.e., Y-, M-, and C-inks, is applied to the recording paper in advance, and Bk ink is overlaid thereon to form the black image.

According to example 2, when there is no color image around the black image area, recording is conducted by Bk-ink which has high recording-density and less feathering incidence. On the other hand, when there is a color image around the black image area, a high-quality color image having no incidence of ink blurring between black ink and color ink can be formed by overlapping C-, M-, Y-, and Bk-inks to form the black image area.

In example 2, the determination about the presence of the color image area adjacent to the black image area can be processed by means of software. However, hardware can be substituted for the software in order to process such a determination.

Example 3

In example 2, X of the aforementioned expression X×P was 1 or less, i.e., 1×P (X=1), wherein P is the pitch of the minimum recording pixel. However, the value of X employed in example 3 is more than 1.

In example 3, an experiment was conducted for recording on various kinds of plain paper by using the inks employed in the example 1. The experiment was conducted for each case when X=√2, 2, 2√2, and 4√2. Each of the results was of the same high standards as that obtained in example 2.

Example 4

The split-recording method was used in example 4.

In the image part B shown in FIG. 7, in which the same inks as in example 1 were used, only the black image area made of black ink was formed by the split-recording method using the laced and the reversely-laced patterns shown in FIG. 1. The resultant image obtained was much sharper at the area where color inks and black ink were overlapped and exhibited no bleeding therein.

Example 5

In example 5, where the periphery of the black image area has at least one portion being adjacent to the color image area, an experiment was conducted by varying the number of color-ink adsorbed pixels with a plurality of colors adsorbed on paper before applying black ink. In example 5, the same ink as in example 1 was used.

Each of FIGS. 8A, 8B, 8C, 8D, and 8E shows an image in which the color image area exists around the black image area having respective pixel numbers. Color inks are applied to the entire black image area of FIGS. 8A and 8B before applying black ink. In this case, an image having no bleeding incidence was obtained.

Figure 8D:
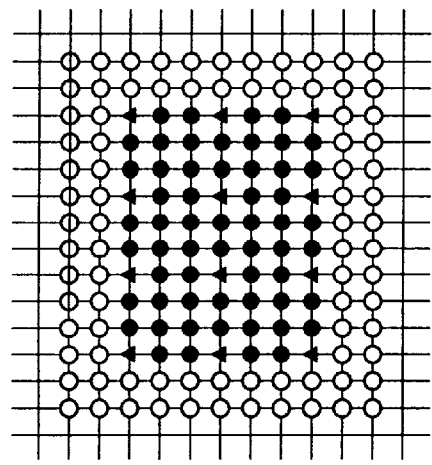
FIGS. 8A, 8B, 8C, 8D, and 8E are illustrations employed to explain example 5.
Figure 8E:
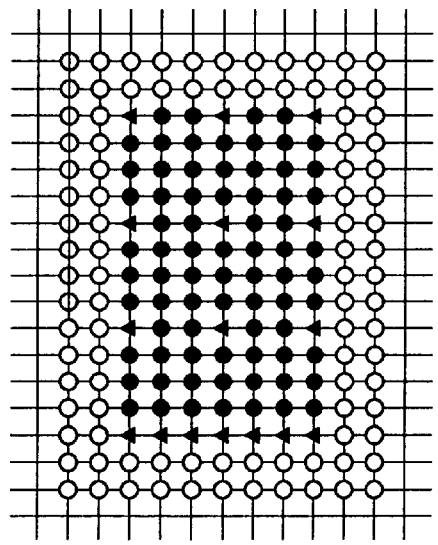
Figure 8A:
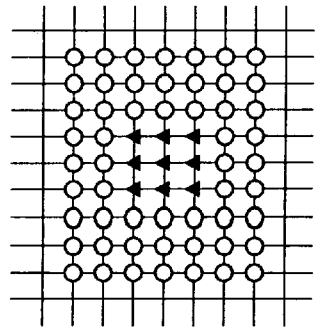
Figure 8B:
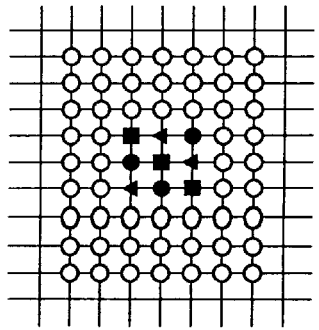
Figure 8C:
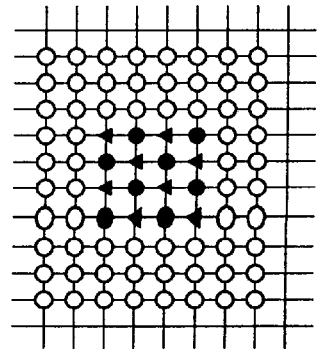

In the black image area shown in FIG. 8C, it can be seen that 2 black pixels form one group, in which there is 1 black pixel in every group being undercoated by different color inks. Accordingly, the ratio of the black pixels, on which color inks were undercoated, to the total number of black pixels was 50%. In the black image area shown in FIG. 8D, it can be seen that 9 black pixels form one group, in which one black pixel, of every group, is undercoated by color ink. Accordingly, the ratio of the black pixels, on which color inks were undercoated, to the total number of black pixels was 11%. In both of the above-mentioned cases, an image having no bleeding therein was obtained. In the black image area shown in FIG. 8E, the above-mentioned ratio obtained in the same manner as in FIGS. 8C and 8D was approximately 8%. Although some bleeding occurred, it was within a permissible range for practical printing purposes. Accordingly, it is found that a preferable ratio of black pixels, on which color ink/inks are applied in advance, to the total number of pixels of the black image is 10%–100%.

Example 6

Black ink was prepared in accordance with the following procedure.

| Preparation of Pigment Dispersion | |
|---|---|
| Sturene-acrylic acid-butyl acrylate copolymer (Acid value: 116, weight average molecular weight: 3700) | 2 parts |
| Monoethanolamine | 1 part |

-continued

| Preparation of Pigment Dispersion | |
|---|---|
| Diethylene glycol | 5 parts |
| Ion-exchanged water | 73 parts |

The above components are mixed, then heated at 70° C. in a water bath to dissolve the resin portion. Additionally, 14 parts of carbon black (MCF 88 made by Mitsubishi Chemical), and 5 parts of isopropyl alcohol were added to the above premixed solution, which then was subjected to mixing to conduct dispersion under the following conditions.

| | |
|---|---|
| Dispersion machine | Sand grinder |
| Grinding medium | Zirconium beads (1 mm dia.) |
| Filling ratio of grinding medium | 50% by volume |
| Grinding period | 3 hours |

Finally, pigment dispersion was obtained by centrifuge processing (for 20 minutes at 12,000 RPM).

| Preparation of Black Ink | |
|---|---|
| Dispersion with the above-mentioned formulation | 30 parts |
| Diethylene glycol | 15 parts |
| Isopropyl alcohol | 5 parts |
| Ion-exchanged water | 50 parts |

After the above-listed components were mixed, monoethanolamine is added in order to adjust the pH to be within the range of 8 pH–10 pH; thus black ink was obtained.

Preparation of Color Inks

Each color ink was prepared in accordance with the following composition and formulation:

| Yellow ink | |
|---|---|
| Dye stuff: | |
| C.I. Direct Yellow 86 | 2.5 parts |
| Thiodiglycol | 7.5 parts |
| Glycerol | 7.5 parts |
| Urea | 7.5 parts |
| Nonionic surfactant: | |
| Acetylenol EH (made by KAWAKEN FINE CHEMICAL) | 5 parts |
| Ion-exchanged water | Balance |

Magenta Ink

Except for the dye stuff, Magenta ink has the same composition as the yellow ink. Three parts of C.I. Acid Red 35 was substituted for 2.5 parts of the C.I. Direct Yellow 86.

Cyan Ink

Except for the dye stuff, Cyan ink has the same composition as the yellow ink. Three parts of C.I. Direct Blue was substituted for 2.5 parts of the C.I. Direct Yellow 86.

Color inks having the above-mentioned compositions were mixed and stirred sufficiently, and then they were subjected to filtration under pressure by means of Phloropore-filter made by SUMITOMO DENKI KOGYO (phonetically translated) having a pore diameter of 0.22 μm.

Figure 9:
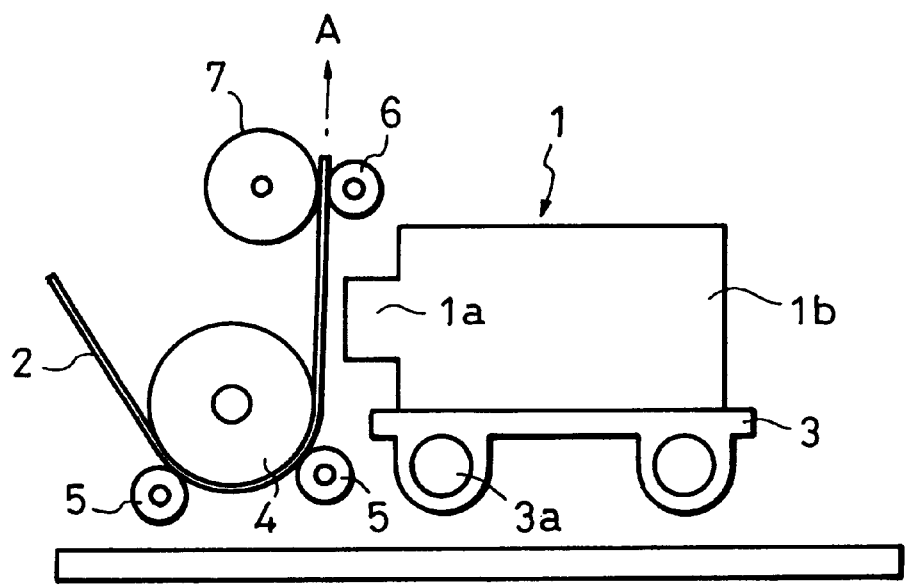
FIG. 9 is an illustration of a recording apparatus according to an embodiment of the present invention.

FIG. 9 shows a recording apparatus used in accordance with the present invention, wherein a recording paper 2 is fed by a transfer roller 4 and an image is printed thereon by means of a recording head 1a. 64 nozzles are provided at the density of 360 dots per inch in the recording head 1a, in which ink is jetted according to printing data at the frequency of 6 kHz.

Figure 10:
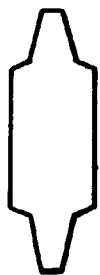
FIG. 10 is an enlarged view of a spur roller which contacts an image recording portion of a recording paper in the recording apparatus shown in FIG. 9.

The recording paper having a printed image thereon can be ejected from the recording apparatus by means of a paper-eject roller 7 driven by a motor (not shown) and Teflon spur rollers which press the recording paper onto the paper-eject roller in order to convey sufficient transfer-force to the recording paper. FIG. 10 is an enlarged view of the spur roller. The circumferential end portion of the spur roller which actually contacts the recording paper has a width of approximately 30 μm. A span orthogonally extending from the later-described longitudinal center line of a recording area by a 2-dot distance to either side (i.e., 4 dots in total, equivalent to approximately 280 μm) is hereinafter defined as the "possible contact-area of the spur roller." The center line is mathematically formed by the center point of the circumferential end portion of the spur roller, which abuts the recording paper.

The following shows recording methods according to the present invention, wherein unconditional recording can be conducted for color image data having no black color portion; on the other hand, conditional recording for black image data (classified into the following 3 cases) can be conducted.

Given that one pixel unit consists of 4 dots (laterally)×64 nozzles (longitudinally) (i.e., 256 pixels in one unit), which is the "possible contact-area of each spur roller."

Case 1

When a black color recording is conducted in 256 pixels, i.e., 100% of the pixel unit, to process black image data: black ink recording is applied on 75% of the one pixel unit (i.e., #192 pixels). Three color inks of yellow, magenta, and cyan are absorbed on the 25% balance.

Case 2

When a black color recording is conducted in less than 100% of the pixel unit consisting of 256 pixels: only black ink is applied for the black image recording.

Case 3

Outside of the "possible contact-area of the spur roller": only black ink is applied for black image recording.

Example 7

The following shows each recording method of the black image data by using the same recording apparatus and inks as employed in example 6.

Given that one pixel unit consists of 4 dots (laterally)×64 nozzles (longitudinally) (i.e., 256 pixels in one unit), which is the "possible contact-area of each spur roller."

Case 1

When black color recording is conducted in 256 pixels, i.e., 100% of the pixel unit, to process black image data:

black ink is absorbed on the entire pixel unit, and at the same time each of three color inks of yellow, magenta, and cyan is absorbed on 64 pixels respectively in a manner such that the color inks do not overlap each other.

In this case, the total amount of ink absorbed on the recording paper becomes greater compared with the case when only black ink is used exclusively. However, the fastness rate of the black image has been improved according to the findings of the inventors of the present invention. This result may be caused due to the improvement of the wettability of the recording paper by means of the nonionic surfactant contained in the color ink.

Case 2

When black color recording is conducted in less than 100% of the pixel unit consisting of 256 pixels: only black ink is applied for black image recording.

Case 3

Outside of the "possible contact-area of the spur roller": only black ink is applied for black image recording.

Example 8

The following shows each recording method of the black image data by using the same recording apparatus and inks as employed in example 6.

Given that one pixel unit consists of 4 dots (laterally)×64 nozzles (longitudinally) (i.e., 256 pixels in one unit), which is the "possible contact-area of each spur roller."

Case 1

To process black image data when black color recording is conducted in 90% or more of one pixel unit (i.e., 231 pixels or more): black ink is absorbed on these pixels, and at the same time one of three color inks of yellow, magenta, and cyan is randomly applied on these pixels.

Case 2

To process black image data when black color recording is conducted in less than 90% of one pixel unit, i.e., 230 pixels or less: black ink is applied on these pixels in accordance with image data.

Case 3

Outside of the "possible contact-area of the spur roller": only black ink is applied for black image recording.

In any of the above three cases, no smearing, or disturbance in appearance, on the image has occurred when spur rollers passed, or rolled on, a high-density black image portion.

When the appearance of the image is evaluated more critically, the black image mixed with color ink has some inferiority in terms of tone and quality compared with the image formed exclusively by black ink. However, the contacting width of each spur roller on the recording paper necessary for ensuring the stable paper transfer is 10 $\mu$m–100 $\mu$m, and the several spur rollers are satisfactory to perform the transferring operation. Consequently, the inventors of the present invention conclude that the spur rollers do not affect the recording performance in any area of the recording paper. Furthermore, the above-mentioned processing is conducted only when a heavy-duty black image is recorded thereon. Therefore, stable transfer of the recording paper can be ensured, and a disturbance in the image appearance can be prevented, thus preventing deterioration in quality of the recording image.

Example 9

Figure 11:
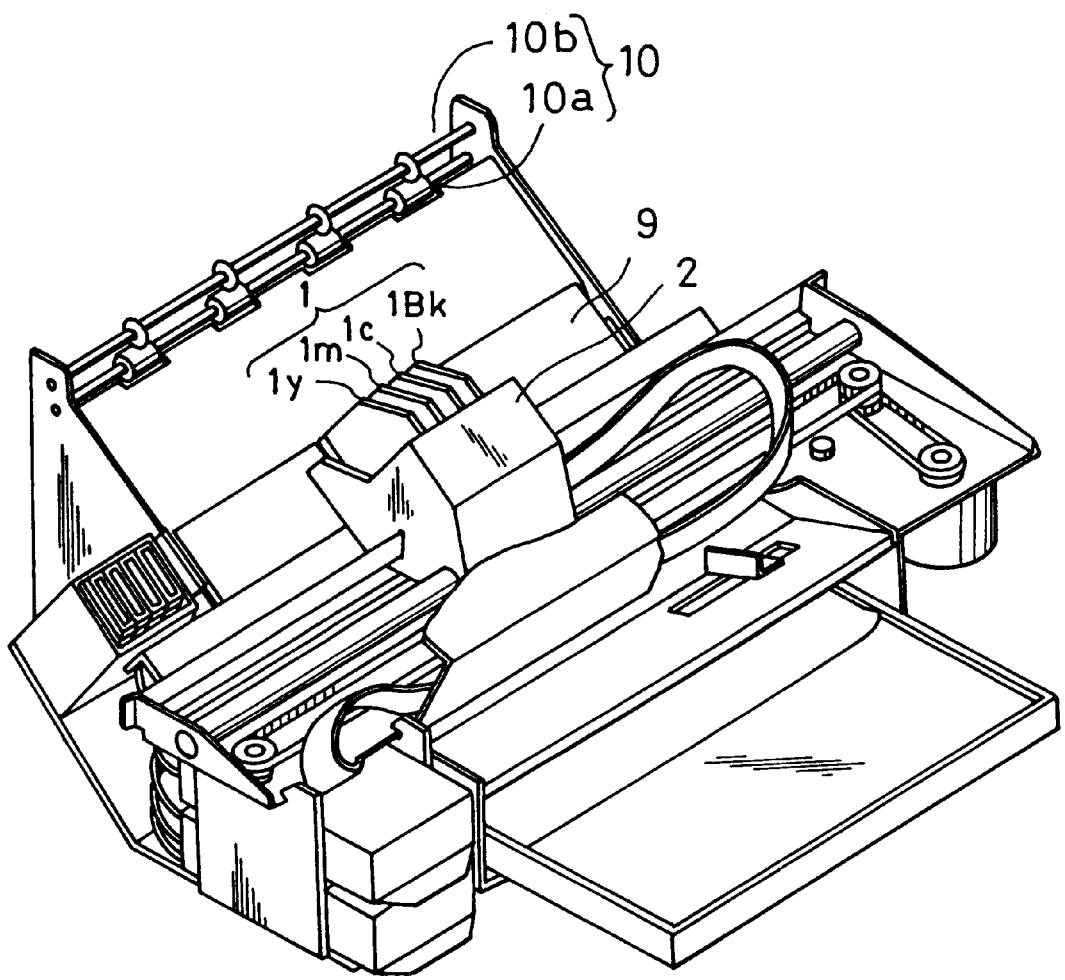
FIG. 11 is a schematic illustration of one example of a recording apparatus employed in the present invention.
Figure 12A:
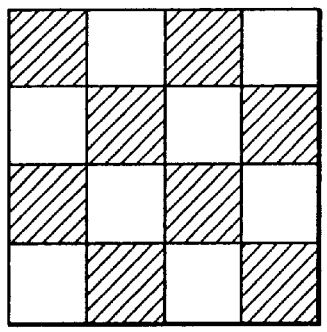
Figure 12B:
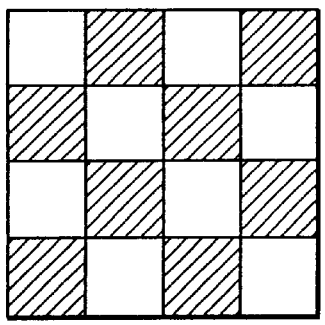
Figure 12C:
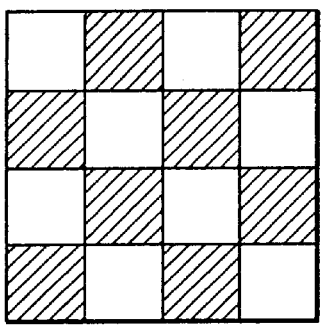
Figure 12D:
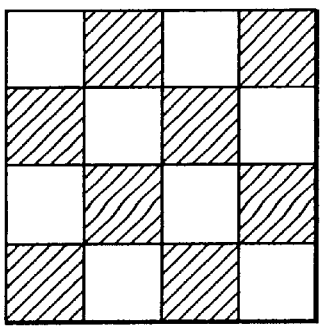

FIG. 11 shows a recording apparatus which uses the same black and color inks as employed in example 6, in which a recording paper 9 is recorded by a recording head 1, and then ejected by means of an ejecting system 10.

Each recording head 1y, 1m, 1c, and 1Bk has 64 nozzles at the density of 360 dots per inch to execute ink-jetting at the frequency of 6 kHz, according to printing data.

The following shows one example of a recording method according to the present invention, wherein unconditional recording can be conducted for color image data having no black color portion; on the other hand, conditional recording classified into the following 2 cases can be conducted for black image data.

Given that one pixel unit consists of 4 dots (laterally)×4 nozzles (longitudinally) (i.e., 16 pixels in one unit).

Case 1

To process black image data when black color recording is conducted in 100% of one pixel unit (i.e., 16 pixels): black image recording is conducted by using black-, yellow-, magenta-, and cyan-inks with patterns shown in FIGS. 12A, 12B, 12C, and 12D respectively.

Case 2

To process black image data when black color recording is conducted in less than 100% of one pixel unit (i.e., 15 pixels or less): black ink is applied on these pixels for recording in accordance with the image data.

As a result of the recording conducted by the above-mentioned methods, there was no noticeable deterioration in image quality and no disturbance in the image appearance even in the area where the black image portion with high density was contacted by a member of a paper ejecting system.

Example 10

The following shows each recording method of the black image data by using the same recording apparatus and inks as employed in example 9.

Given that one pixel unit consists of 4 dots (laterally)×4 nozzles (longitudinally) (i.e., 16 pixels in one unit).

Case 1

To process black image data when black color recording is conducted in 100% of one pixel unit (i.e., 16 pixels): black ink is absorbed on 50% of the pixels randomly selected, and at the same time three color inks of yellow, magenta, and cyan are used on the remaining 50% of the pixels to conduct a recording of the black image.

Case 2

To process black image data when black color recording is conducted in less than 100% of one pixel unit, (i.e., 15 pixels or less): black ink is applied on these pixels for recording in accordance with the image data.

As a result of the recording conducted by the above-mentioned methods, there was no noticeable deterioration in image quality and no disturbance in the image appearance even in the area where the black image portion with high density was contacted by a member of a paper ejecting system.

Example 11

The following shows each recording method of the black image data by using the same recording apparatus and inks as employed in example 9.

Given that one pixel unit consists of 4 dots (laterally)×4 nozzles (longitudinally) (i.e., 16 pixels in one unit).

Case 1

To process black image data when black color recording is conducted in 100% of one pixel unit (i.e., 16 pixels): black ink is absorbed on the entire pixels, and at the same time each of three color inks of yellow, magenta, and cyan is absorbed on 4 pixels respectively in a manner such that the color inks do not overlap each other.

In this case, the total amount of ink absorbed on the recording paper is greater compared with the case when only black ink is used exclusively. However, the fastness rate of the black image has been improved according to the findings of the inventors of the present invention. This result may be caused due to an improvement in the wettability of the recording paper by means of the nonionic surfactant contained in the color ink.

Case 2

To process black image data when black color recording is conducted in less than 100% of one pixel unit, (i.e., 15 pixels or less): black ink is applied on these pixels for recording in accordance with the image data.

As a result of the recording conducted by the above-mentioned methods, there was no noticeable deterioration in image quality and no disturbance in the image appearance even in the area where the black image portion with high density was contacted by a member of a paper ejecting system.

Example 12

The following shows each recording method of the black image data by using the same recording apparatus and inks as employed in example 9.

Given that one pixel unit consists of 4 dots (laterally)×64 nozzles (longitudinally) (i.e., 256 pixels in one unit).

Case 1

When black color recording is conducted in 90% or more of the entire pixels: black ink is absorbed on these black color recording pixels, and at the same time each of three color inks of yellow, magenta, and cyan is absorbed on 64 pixels respectively in a manner such that the color inks will not overlap each other.

Case 2

When black color recording is conducted in less than 90% of the entire pixels: black ink is applied on these pixels for recording in accordance with image data.

As a result of the recording conducted by the above-mentioned methods, there was no noticeable deterioration in image quality and no disturbance in the image appearance even in the area where the black image portion with a high density was contacted by a member of a paper ejecting system.

According to the present invention, a high-quality color image can be obtained in which an incidence of bleeding between black ink and color inks is prevented. Especially, when a color image is not formed in the surrounding boundary or periphery of a black image area, a black image having a high recording-density with less incidence of feathering can be formed; and when the color image is formed in the adjacent area of the black image area, a color image having a superior recording quality is formed in which the color bleeding does not occur between the black ink and color inks. According to the present invention, a high-quality black image and a high-quality color-image can be obtained at the same time.

In addition, when image recording is conducted by means of the ink-jet recording apparatus, a printing quality of black letters can be ensured, and a disturbance in the image appearance caused by the contact of the image area with a paper transfer system can be eliminated, thus preventing deterioration in quality of the recording image.

Furthermore, according to the present invention, the quality of the black image can be maintained as much as possible, and an incidence of an inferiority of fastness in the black image recording portion with a high density can be prevented.

Although the present invention has been described with respect to what is considered to be the preferred embodiments, it is understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink-jet recording method of forming a black image on a recording member based on image data, said method comprising the steps of:
    providing each of (i) a black ink having a first penetration rate, and (ii) a plurality of color inks at least one of which has a second penetration rate higher than the first penetration rate;
    determining one of a presence or an absence of an adjacent region between a color image and a black image in the image data; and
    applying ink to the recording member to form the black image in accordance with the determination in said determining step such that either (i) only black ink is applied to the recording member, or (ii) black ink is applied to the recording member after the at least one of the plurality of color inks has been absorbed into the recording member;
    wherein an ink jetting amount of the color ink per one pixel is smaller than that of the black ink when the color ink and the black ink are superposed on the recording member.

2. An ink-jet recording method of forming a black image according to claim 1, wherein each of the plurality of color inks comprises a penetration agent of surfactant or monovalent aliphatic alcohol having 1 to 7 carbon atoms.

3. An ink-jet recording method of forming a black image according to claim 2, wherein a content amount of the penetration agent in each of the plurality of color inks is within a range of 0.1% through 20% of the total ink weight.

4. An ink-jet recording method according to claim 1, wherein if the presence of an adjacent region is determined in said determining step, then the black image is formed in said applying step by applying black ink to the recording member after the at least one of the plurality of color inks has absorbed into the recording member.

5. An ink-jet recording method according to claim 1, wherein if the absence of an adjacent region is determined in said determining step, then the black image is formed in said applying step by applying only black ink to the recording member.

6. An ink-jet recording method according to claim 1, wherein the at least one of the plurality of color inks comprises at least one of yellow ink, magenta ink, cyan ink, red ink, green ink, and blue ink.

7. An ink-jet recording method according to claim 1, wherein an ink-jetting amount of the plurality of color inks per one pixel is smaller than that of the black ink.

8. An ink-jet recording method according to claim 7, wherein the ink jetting amount per one pixel of the color ink is in a range of between $1/3$ and $2/3$ of that of the black ink.

9. An ink-jet recording method according to claim 1, wherein an adjacent region is formed by a plurality of operation frequencies of a recording head.

10. An ink-jet recording method according to claim 1, wherein a number of pixels on which the at least one of the plurality of color inks is adsorbed is within a range of 10% through 100% of a total numbers of pixels of the black image when an adjacent region is determined to be present.

11. An ink-jet recording method according to claim 1, wherein the black image is formed by an ink-jet recording method in which ink droplets can be discharged by applying thermal energy to said inks.

12. An ink-jet recording method according to claim 1, wherein the recording member is a plain paper.

13. An ink-jet recording method according to claim 1, wherein the amount of the color ink per one pixel is in a range between $1/3$ to $2/3$ of the amount of the black ink.

14. An ink-jet recording apparatus for forming a black image on a recording member based on image data, said ink-jet recording apparatus comprising:
   an ink set comprising (i) a black ink having a first penetration rate, and (ii) a plurality of color inks at least one of which has a second penetration rate higher than the first penetration rate;
   determining means for determining one of a presence or an absence of an adjacent region between a color image and a black image in the image data; and
   deciding means for deciding in accordance with a determination by said determining means whether the black image should be formed either (i) by applying only black ink to the recording member, or (ii) by applying black ink to the recording member after the at least one of said plurality of color inks has been absorbed into the recording member;
   printing means for applying ink to the recording member to form the black image in accordance with a decision of said deciding means;
   wherein the apparatus is composed so that an ink jetting amount of the color ink per one pixel is smaller than that of the black ink when the color ink and the black ink are superposed.

15. An ink-jet recording apparatus according to claim 14, wherein said printing means applies ink to the recording member by applying thermal energy to said black ink and to said at least one of said plurality of color inks to discharge ink droplets onto the recording member.

16. An ink-jet recording apparatus according to claim 14, wherein the at least one of said plurality of color inks comprises at least one of yellow ink, magenta ink, cyan ink, red ink, green ink, and blue ink.

17. An ink-jet recording apparatus according to claim 14, wherein the recording member is a plain paper.

18. An ink-jet recording apparatus according to claim 14, wherein the ink jetting amount per one pixel of color inks is smaller than that of the black ink.

19. An ink-jet recording apparatus according to claim 18, wherein the ink jetting amount per one pixel of the color ink is in a range of between $1/3$ and $2/3$ of that of the black ink.

20. An ink-jet recording method for forming a color image composed of a black image and a color image on a recording member, a part of the black image being adjacent to the color image, comprising the steps of:
   (i) providing a black ink having a first penetration rate and a color ink having a second penetration rate which is higher than the first penetration rate;
   (ii) applying the black ink to the recording member by an ink-jet ejecting method and forming the black image; and
   (iii) applying the color ink to the recording member by an ink-jet ejecting method and forming the color image, wherein
   step (ii) comprises the sub-step of applying the color ink to a certain position in an area where the black image adjacent to the color image is recorded, and then applying the black ink to the position where the color ink has been applied, and wherein an ink jetting amount of the color ink per one pixel is smaller than that of the black ink when the color ink and the black ink are superposed.

21. The ink-jet recording method according to claim 20, wherein the color ink is at least one of yellow ink, magenta ink, cyan ink, red ink, green ink and blue ink.

22. The ink-jet recording method according to claim 20, wherein the color ink comprises a penetration agent of surfactant or monovalent aliphatic alcohol having 1 to 7 carbon atoms.

23. The ink-jet recording method according to claim 22, wherein an amount of the penetration agent in the color ink is within a range of from 0.1 through 20% of the total ink weight.

24. The ink-jet recording method according to claim 20, wherein the penetration agent is an ethylene oxide addition product of an alkyl phenyl ether.

25. The ink-jet recording method according to claim 20, wherein the ink-jet ejecting method comprises the step of ejecting a droplet of the ink through an orifice of a recording head by applying energy to the ink.

26. The ink-jet recording method according to claim 25, wherein the energy is thermal energy.

27. The ink-jet recording method according to claim 25, wherein the volume of the color ink droplet ranges between $1/3$ to $2/3$ of the volume of the black ink droplet.

28. The ink-jet recording method according to claim 20, wherein the black image adjacent to the color image is composed of a plurality of pixels, and the color ink is applied to positions where the pixels are formed, the number of the positions being 10% or more of the total number of the pixels.

29. The ink-jet recording method according to claim 20, wherein the recording member is a plain paper.

30. A process for controlling bleeding between a black image and a color image adjacent to the black image, both images being formed on a recording member by an ink-jet printing method, comprising the steps of:
   (i) applying a black ink having a first penetration rate with respect to the recording member on the recording medium and forming the black image; and
   (ii) applying a color ink having a second penetration rate with respect to the recording member which is higher than the first penetration rate on the recording member and forming the color image, wherein step (i) comprises the sub-step of applying the color ink to a certain position in an area where the black image adjacent to the color image is recorded, and then applying the black ink to the position where the color ink has been applied, and wherein an ink jetting amount of the color ink per one pixel is smaller than that of the black ink when the color ink and the black ink are superposed on the recording member.

31. The process according to claim 30, wherein the black image adjacent to the color image is composed of a plurality of pixels, and the color ink is applied to positions where the pixels are formed, the number of the positions being 10% or more of the total number of the pixels.

32. The process according to claim 30, wherein the color ink is at least one of yellow ink, magenta ink, cyan ink, red ink, green ink and blue ink.

33. The process according to claim 30, wherein the color ink comprises a penetration agent of surfactant or monovalent aliphatic alcohol having 1 to 7 carbon atoms.

34. The process according to claim 33, wherein an amount of the penetration agent in the color ink is within a range of from 0.1 through 20% of the total ink weight.

35. The process according to claim 30, wherein the penetration agent is an ethylene oxide addition product of an alkyl phenyl ether.

36. The process according to claim 30, wherein the ink-jet ejecting method comprises the step of ejecting a droplet of the ink through an orifice of a recording head by applying energy to the ink.

37. The process according to claim 36, wherein the energy is thermal energy.

38. The process according to claim 37, wherein the volume of the color ink droplet ranges between $1/3$ to $2/3$ of the volume of the black ink droplet.

39. The process according to claim 30, wherein the recording member is a plain paper.

40. An ink-jet recording method using an ink-jet recording apparatus configured such that at least one portion of a recording paper with a printed image including a black image thereon contacts a portion of the ink-jet recording apparatus, the black image extending to an area where the paper contacts a portion of the ink-jet recording apparatus, said method comprising the steps of:

(i) providing a black ink and a color ink containing a larger amount of nonionic surfactant than the black ink; and (ii) applying the black ink on the recording member and forming the black image, wherein step (ii) comprises the sub-step of: determining whether or not an optical density of the black image in the area where the paper contacts a portion of the ink-jet recording apparatus exceeds a predetermined threshold value; and applying the color ink to a certain position in the area when the optical density exceeds the threshold value.

41. The ink-jet recording method according to claim 40, wherein the nonionic surfactant comprises at least one of higher alcohol, alkylphenol, polyalcohol and acetylene glycol.

42. A process for controlling smearing of an image containing a black image, wherein the image is formed on a recording member by applying a black ink having a first penetration rate to the recording member with an ink-jet printing machine provided with a spur roller for conveying the recording member, and wherein the image is composed of a plurality of pixels, comprising the steps of:

(i) determining whether the black image to be printed in a possible contact area of the spur roller has an optical density exceeding a predetermined threshold value or not; and (ii) applying a color ink having a second penetration rate higher than the first penetration rate to a certain position in the area when the optical density of the black image to be printed in the area exceeds the threshold value.

43. The process according to claim 42, wherein step (ii) comprises the sub-steps of:

applying the black ink in the area so as to form some of the pixels; and applying the color ink in the area so as to form the rest of the pixels.

44. The process according to claim 42, wherein step (ii) comprises the sub-steps of:

applying the black ink so as to form all the pixels in the area; and applying the color ink so as to form some of the pixels in the area.

45. A process for forming an image including a black image on a recording medium comprising the steps of:

(a) providing a black ink having a first penetration rate with respect to the recording medium, and a color ink having a second penetration rate with respect to the recording medium, wherein the second penetration rate is higher than the first penetration rate; and (b) applying the black ink to an area where the black image is formed on the recording medium, wherein step (b) comprises the sub-step of:

applying the color ink to the area when an amount of black ink per unit area in the area that is to be applied to the recording medium exceeds a threshold, wherein the amount is determined according to data for the black image.

46. The process according to claim 45, wherein the sub-step comprises applying the black ink and the color ink so that the inks are superposed.

47. A process for forming an image including a black image on a recording medium comprising the steps of:

(a) providing a black ink having a first penetration rate with respect to the recording medium, and color inks at least one of which has a second penetration rate with respect to the recording medium, wherein the second penetration rate is higher than the first penetration rate, and the color inks are necessary for forming black color by mixing with each other; and (b) applying the black ink to an area where the black image is formed on the recording medium, wherein step (b) comprises the sub-step of:

applying the color inks to the area when an amount of black ink per unit area in the area that is to be applied to the recording medium exceeds a threshold, wherein the amount is determined according to data for the black image.

48. The process according to claim 47, wherein the sub-step comprises applying the black ink and the color inks so as not to be superposed in the unit area.

49. A process for improving quality of an ink-jet recorded image that includes a black image on a recording medium, comprising the step of controlling an ink-applying means so that a black ink having a first penetration rate with respect to the recording medium and a color ink having a second penetration rate with respect to the recording medium higher than the first penetration rate are applied to an area where the black image is formed on the recording medium when an amount of black ink per unit area in the area exceeds a threshold, wherein the amount is determined according to data for the black image.

50. The process according to claim 49, wherein the step comprises the sub-step of applying the black ink and the color ink to the unit area so that both of the inks are superposed in the unit area.

51. A process for improving quality of an ink-jet recorded image that includes a black image on a recording medium comprising the step of controlling an ink-applying means so that a first black dot and a second black dot are formed in an area where the black image is formed, wherein the first black dot is formed with a black ink having a first penetration rate with respect to the recording medium and the second black dot is formed with color inks at least one of which has a second penetration rate with respect to the recording medium higher than the first penetration rate, when an amount of black ink per unit area in the area exceeds a threshold, wherein the amount is determined according to data for the black image.

* * * * *

UNITED STATES PATENT AND TRADEMARK OFFICE
CERTIFICATE OF CORRECTION

PATENT NO. : 6,186,615 B1
DATED : February 13, 2001
INVENTOR(S) : Shinichi Sato et al.

It is certified that error appears in the above-identified patent and that said Letters Patent is hereby corrected as shown below:

Title page,
Item [*], insert -- [*] Notice: This patent issued on a continued prosecution application filed under 37 CFR 1.53 (d), and is subject to the twenty-year patent term provisions of 35 U.S.C. 154 (a) (2). --

Column 2,
Line 7, "of" should read -- of a --.
Line 19, "area" should read -- area, --.
Line 48, "of" (first occurrence) should be deleted.
Line 49, "having" should read -- has --.

Column 3,
Line 3, "wherein" should read -- wherein the --.

Column 9,
Line 15, "321Y," should read -- 312Y, --.
Line 39, "is" should read -- are --.

Column 10,
Line 63, "Sturene-" should read -- Styrene- --.

Column 12,
Line 44, "#" should be deleted.

UNITED STATES PATENT AND TRADEMARK OFFICE
CERTIFICATE OF CORRECTION

PATENT NO.   : 6,186,615 B1
DATED        : February 13, 2001
INVENTOR(S)  : Shinichi Sato et al.

It is certified that error appears in the above-identified patent and that said Letters Patent is hereby corrected as shown below:

Column 17,
Line 22, "numbers" should read -- number --.

Signed and Sealed this

Twenty-second Day of October, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,186,615 B1
DATED : February 13, 2001
INVENTOR(S) : Shinichi Sato et al.

It is certified that error appears in the above-identified patent and that said Letters Patent is hereby corrected as shown below:

Title page,
Item [*], insert: -- [*] Notice: This patent issued on a continued prosecution application filed under 37 CFR 1.53(d), and is subject to the twenty-year patent term provisions of 35 U.S.C. 154(a)(2). --

Column 2,
Line 7, "of" should read -- of a --.
Line 19, "area" should read -- area, --.
Line 48, "of" (first occurrence) should be deleted.
Line 49, "having" should read -- has --.

Column 3,
Line 3, "wherein" should read -- wherein the --.

Column 9,
Line 15, "321Y," should read -- 312Y, --.
Line 39, "is" should read -- are --.

Column 10,
Line 63, "Sturene-" should read -- Styrene- --.

Column 12,
Line 44, "#" should be deleted.

Column 17,
Line 22, "numbers" should read -- number --.

Signed and Sealed this

Twenty-ninth Day of October, 2002

Attest:

Attesting Officer

JAMES E. ROGAN
Director of the United States Patent and Trademark Office